(12) United States Patent
Nakaho et al.

(10) Patent No.: US 6,552,653 B2
(45) Date of Patent: Apr. 22, 2003

(54) COMMUNICATION SYSTEM FOR A VEHICLE AND VEHICLE ACCESSORY OPERATION SYSTEM THAT UTILIZES THE COMMUNICATION SYSTEM

(75) Inventors: Junichi Nakaho, Nagoya (JP); Takashi Ichikawa, Nagoya (JP)

(73) Assignee: Kabushiki Kaisha Tokai-Rika-Denki-Seisakusho, Niwa-gun (JP)

( * ) Notice: Subject to any disclaimer, the term of this patent is extended or adjusted under 35 U.S.C. 154(b) by 0 days.

(21) Appl. No.: 09/816,064

(22) Filed: Mar. 26, 2001

(65) Prior Publication Data

US 2001/0026215 A1 Oct. 4, 2001

(30) Foreign Application Priority Data

Mar. 29, 2000 (JP) ........................................ 2000-090805

(51) Int. Cl.⁷ ................................................ B60Q 1/00
(52) U.S. Cl. ................................ 340/425.5; 340/815.4; 340/438
(58) Field of Search ................................ 340/425.5, 815.4, 340/461, 438; 362/494

(56) References Cited

U.S. PATENT DOCUMENTS

| | | | | |
|---|---|---|---|---|
| 5,196,965 A | * | 3/1993 | Lang et al. | 359/841 |
| 5,566,224 A | * | 10/1996 | Azam et al. | 455/566 |
| 5,689,241 A | * | 11/1997 | Clarke, Sr. et al. | 340/575 |
| 6,127,919 A | * | 10/2000 | Wylin | 340/425.5 |
| 6,218,934 B1 | * | 4/2001 | Regan | 340/438 |
| 6,243,003 B1 | * | 6/2001 | DeLine et al. | 340/425.5 |
| 6,326,900 B2 | * | 12/2001 | DeLine et al. | 340/815.4 |
| 6,329,925 B1 | * | 12/2001 | Skiver et al. | 340/815.4 |

FOREIGN PATENT DOCUMENTS

| | | |
|---|---|---|
| DE | 3417956 | 11/1985 |
| EP | 0860325 A2 | 8/1998 |
| WO | WO98/44470 | 10/1998 |

OTHER PUBLICATIONS

International Search Report, Feb. 21, 2002.

* cited by examiner

*Primary Examiner*—John Tweel
(74) *Attorney, Agent, or Firm*—Nixon Peabody LLP; Thomas W. Cole

(57) ABSTRACT

In order to provide a communication system for a vehicle and an vehicle accessory operation system that utilizes the communication system for a vehicle which can achieve lower cost and non-wire harness structure as long as possible, there is provided a communication system for a vehicle, the communication system comprising an inner view mirror provided with a first infrared ray projecting and receiving section that is capable of at least one of projecting and receiving an infrared ray, and at least one vehicle accessory other than the inner view mirror, which vehicle accessory is provided with a second infrared ray projecting and receiving section that is capable of at least one of projecting and receiving an infrared ray and that is disposed so as to communicate with the inner view.

16 Claims, 5 Drawing Sheets

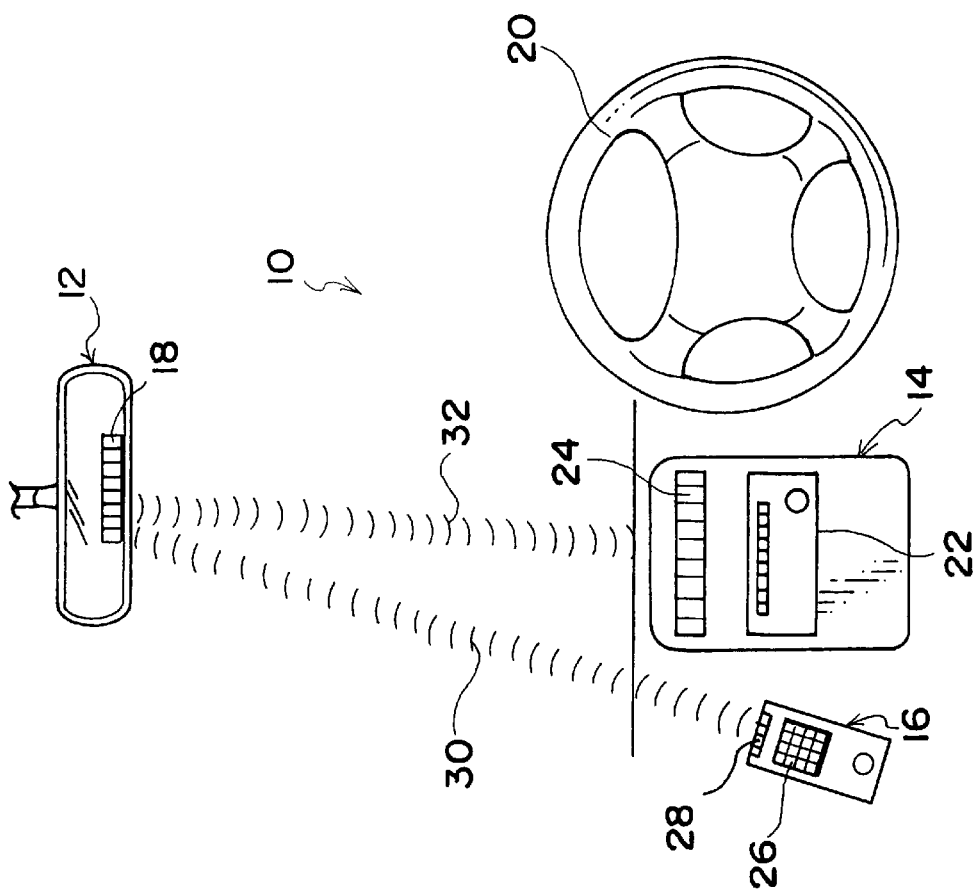

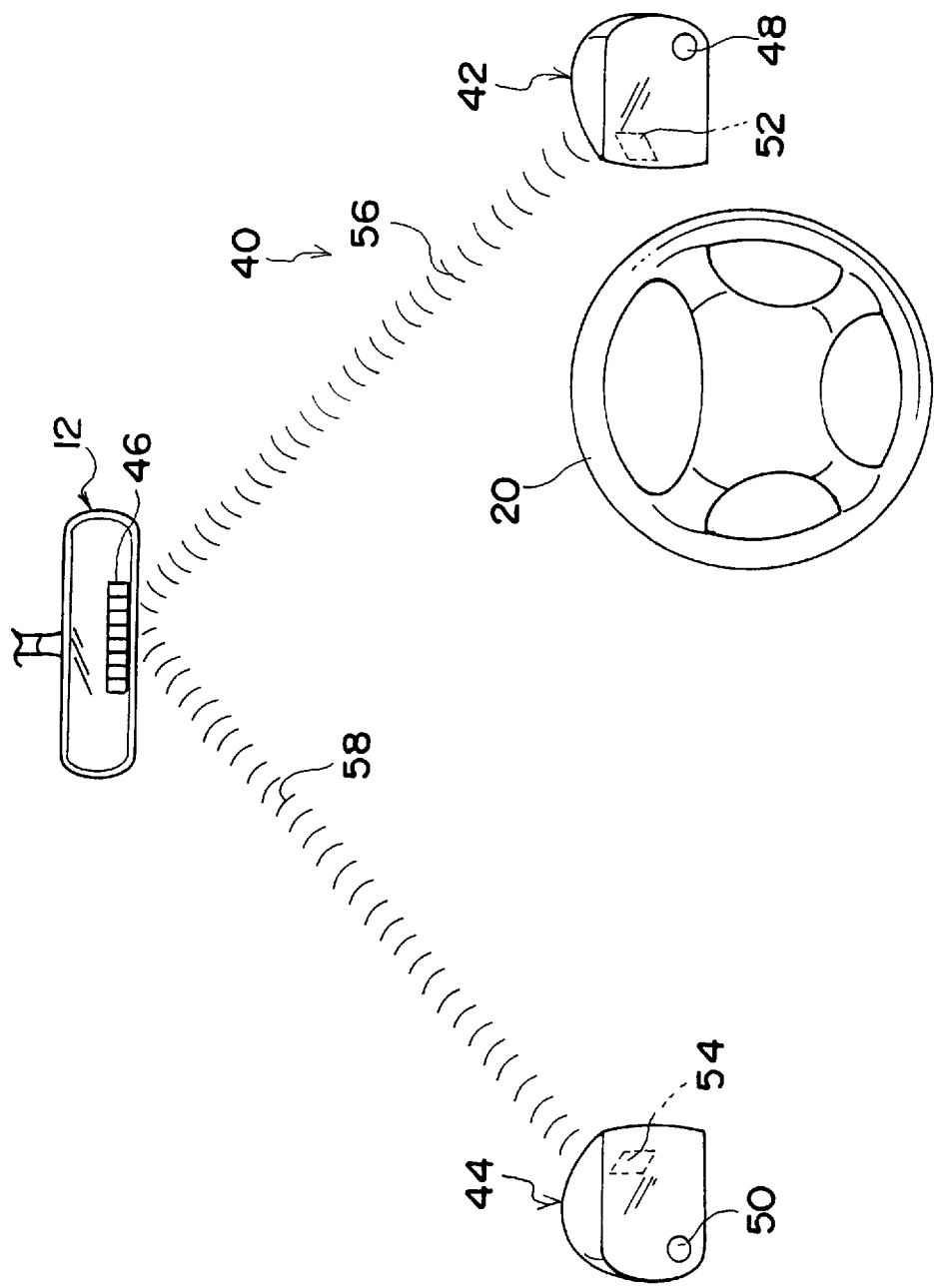

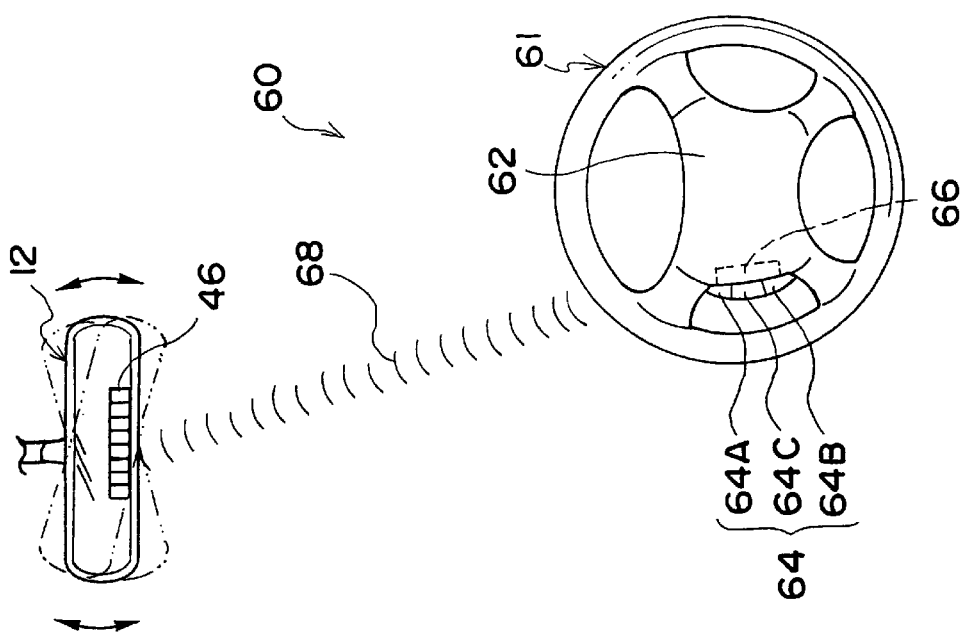

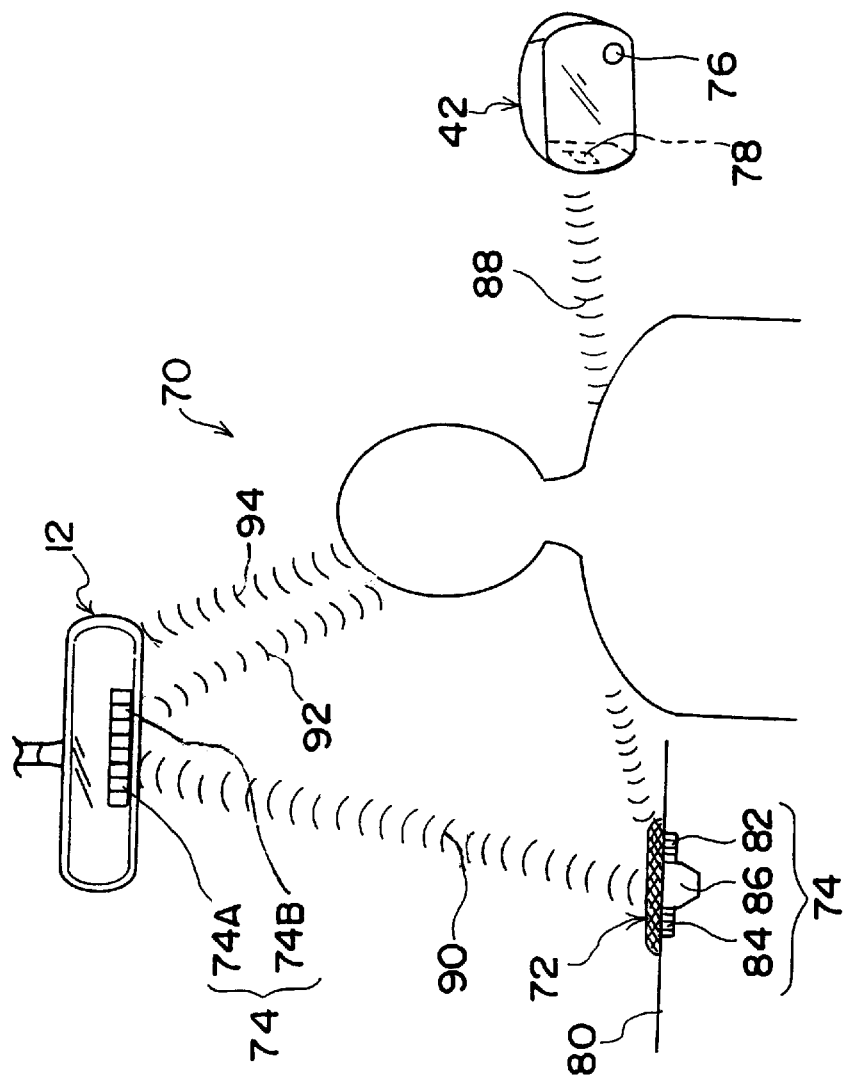

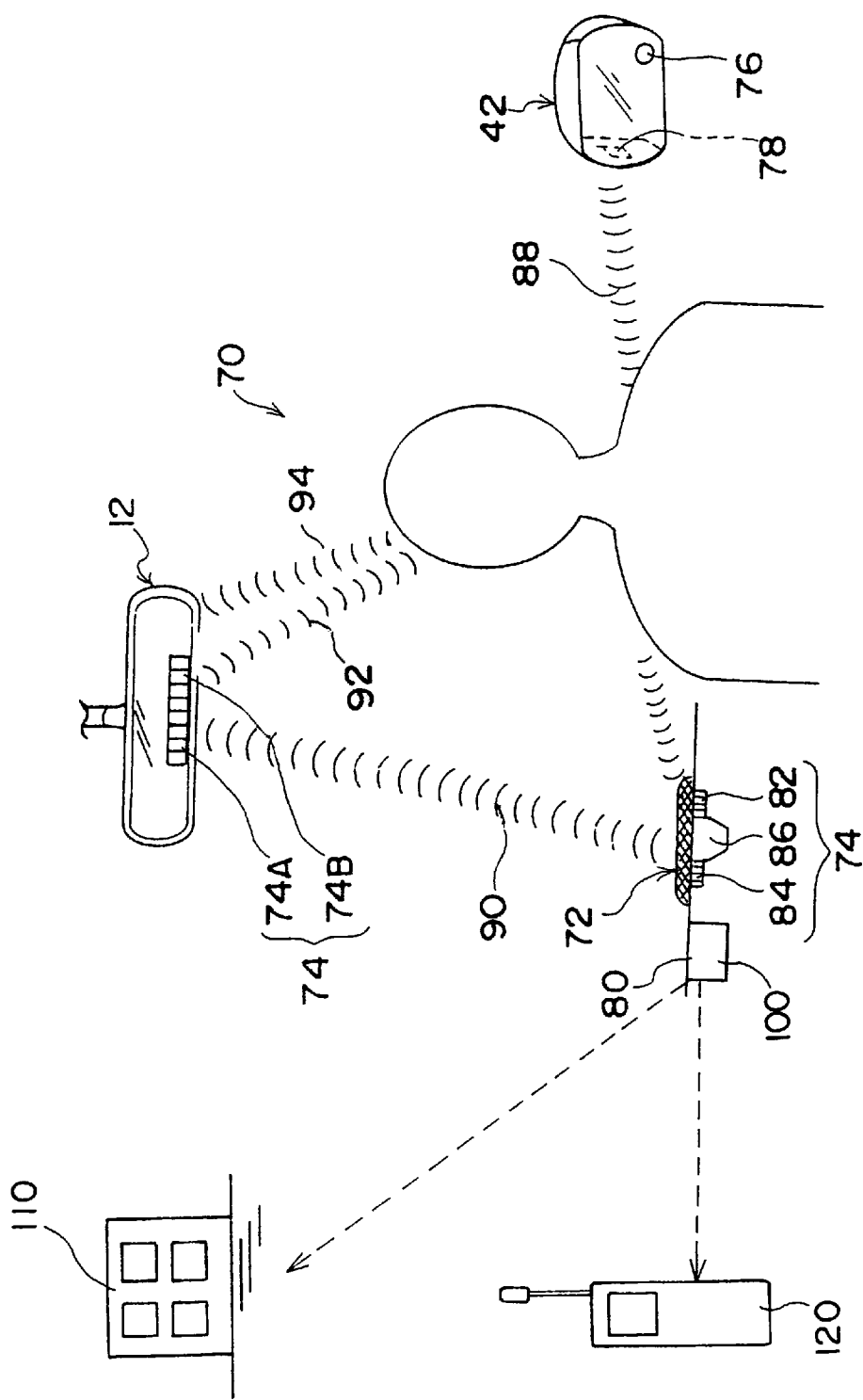

COMMUNICATION SYSTEM FOR A VEHICLE AND VEHICLE ACCESSORY OPERATION SYSTEM THAT UTILIZES THE COMMUNICATION SYSTEM

BACKGROUND OF THE INVENTION

1. Field of the Invention

The present invention relates to a communication system for a vehicle and a vehicle accessory operation system that utilizes the communication system for a vehicle.

2. Description of the Related Art

Many currently used vehicle accessories are electronically controlled. For example, an electric retraction type door mirror device of a vehicle is structured such that a door mirror is automatically retracted by operation of a door mirror operation switch.

In the conventional art, wire harnesses are used to maintain electric connection states of these various vehicle accessories.

It is predicted that electrification of vehicle accessory will continue to progress. Accordingly, if sending and receiving of signals are performed by use of wire harnesses, as hitherto, there will arise a problem of the number of wire harnesses increasing. Accordingly, there will be problems in that cost increases due to the number of parts increasing and the number of assembly processes increasing, weight becomes heavier, space in a vehicle becomes smaller, design is constrained, and the like.

In order to maximally reduce usage of wire harnesses, a sending and receiving signal system that uses electric waves has been proposed. However, in a sending and receiving signal system that uses the electric waves, in general, costs of electric waves-related parts, such as a transmitter and a receiver, are expensive. Thus, cost becomes higher, and the cost tends to exceed the benefits.

SUMMARY OF THE INVENTION

The present invention takes the facts mentioned above into consideration, and an object of the present invention is to provide a communication system for a vehicle which can achieve maximum elimination of wire harnesses at low cost, and a vehicle accessory operation system that utilizes the communication system for a vehicle.

In a first aspect of the present invention, there is provided a communication system for a vehicle, the communication system comprising: an inner view mirror provided with a first infrared ray projecting/receiving section that is capable of at least one of projecting and receiving an infrared ray; and at least one vehicle accessory other than the inner view mirror, which vehicle accessory is provided with a second infrared ray projecting/receiving section that is capable of at least one of projecting and receiving an infrared ray and that is disposed so as to communicate with the inner view mirror.

According to the first aspect of the present invention, the inner view mirror is provided with the first infrared ray projecting and receiving section. The first infrared ray projecting and receiving section can project or receive infrared rays. Also, at least one vehicle accessory other than the inner view mirror is provided with the second infrared ray projecting and receiving section. The second infrared ray projecting and receiving section can project or receive infrared rays. Accordingly, communication between the inner view mirror and the vehicle accessory can be made possible by including communicative content in the infrared ray.

Accordingly, in the present invention, bearing in mind advantages of the inner view mirror (namely, the inner view mirror is characterized by being located in a position such that the infrared rays are unlikely to be blocked (the infrared rays projected therefrom or received thereat are unlikely to be blocked), and in a position which is relatively close to the positions of the various vehicle accessories), the above mentioned communication system for a vehicle between the inner view mirror and the one or more vehicle accessories is achieved. Accordingly, it is possible to eliminate the wire harnesses, which are needed in the conventional communication system for a vehicle, are not required.

Also, in the present embodiment, because the communication system for a vehicle is achieved by use of infrared rays, the cost can be kept lower than with a similar communication system for a vehicle in which electric waves are used.

In accordance with a second aspect of the present invention, there is provided a vehicle accessory operating system of a vehicle, wherein the vehicle has a communication system which includes an inner view mirror provided with a first infrared ray projecting/receiving section that is capable of at least one of projecting and receiving an infrared ray, and which includes at least one vehicle accessory other than the inner view mirror, which vehicle accessory is provided with a second infrared ray projecting/receiving section that is capable of at least one of projecting and receiving an infrared ray and that is disposed so as to communicate with the inner view mirror, at least one of the inner view mirror and the vehicle accessory is provided with an operating device, and the operating device is operated by utilization of the communication system.

Communication between the inner view mirror and the one or two or more vehicle accessories in accordance with the second aspect of the present invention as described below would be possible with wire harnessless.

For example, a steering switch is disposed at a steering wheel. Also, an infrared ray projecting section is provided at the steering wheel. An operation device, which is a display device or a drive device for a mirror angle adjustment device or the like, and an infrared ray receiving section are provided at the inner view mirror. When a driver seated on a seat of the vehicle operates the steering switch, an infrared ray is projected from the infrared ray projecting section toward the inner view mirror. Communicative content is included in and carried by the infrared ray. The projected infrared ray is received at the infrared ray receiving section provided at the inner view mirror. At the inner view mirror, on the basis of the communicative content included in and carried by the received infrared ray, a predetermined display (time, running distance of the vehicle, fuel remaining, outside temperature, inside temperature, a character broadcast such as text information or the like) is displayed on the inner view mirror, or the mirror angle adjustment device is operated to automatically adjust the angle of the mirror such that a rear field of view is optimal for the driver.

In accordance with a third aspect of the present invention, there is provided a communication system for a vehicle according to the first aspect, wherein the first infrared ray projecting and receiving section is an infrared ray projecting and receiving section provided at the inner view mirror, the second infrared ray projecting and receiving section includes an infrared ray receiving section provided at the vehicle accessory and an infrared ray projecting section provided at a device for operating the vehicle accessory.

In accordance with a fourth aspect of the present invention, there is provided a communication system for a vehicle according to the first aspect, wherein the first infrared ray projecting and receiving section is an infrared ray receiving section provided at the inner view mirror, the second infrared ray projecting and receiving section is an infrared ray projecting section provided at the vehicle accessory.

In accordance with a fifth aspect of the present invention, there is provided a communication system for a vehicle according to the first aspect, wherein the first infrared ray projecting and receiving section includes an infrared ray receiving section and an infrared ray projecting and receiving section, which are provided at the inner view mirror, the second infrared ray projecting and receiving section includes an infrared ray projecting section provided at a first vehicle accessory and an infrared ray projecting and receiving section provided at second vehicle accessory.

In accordance with a sixth aspect of the present invention, there is provided a vehicle accessory operating system of a vehicle according to the second aspect, wherein the operating device is at least one of: a display device for displaying information on the basis of the information received from the second infrared ray projecting and receiving section; and an driving device for driving at least one of the inner view mirror and the vehicle accessory on the basis of the information received from the second infrared ray projecting and receiving section.

In accordance with a seventh aspect of the present invention, there is provided a vehicle accessory operating system of a vehicle according to the sixth aspect, wherein the first infrared ray projecting and receiving section is an infrared ray receiving section provided at the inner view mirror, the second infrared ray projecting and receiving section is an infrared ray projecting section provided at the vehicle accessory, the operating device is the display device for displaying the information received from the second infrared ray projecting and receiving section.

In accordance with a eighth aspect of the present invention, there is provided a vehicle accessory operating system of a vehicle according to the sixth aspect, wherein the first infrared ray projecting and receiving section is an infrared ray receiving section provided at the inner view mirror, the second infrared ray projecting and receiving section is an infrared ray projecting section provided at the vehicle accessory, the operating device includes the display device for displaying information received from the second infrared ray projecting and receiving section, and the driving device for driving the inner view mirror on the basis of the information received from the second infrared ray projecting and receiving section.

In accordance with a ninth aspect of the present invention, there is provided a vehicle accessory operating system of a vehicle according to the sixth aspect, wherein the first infrared ray projecting and receiving section includes an infrared ray receiving section and an infrared ray projecting and receiving section, which are provided at the inner view mirror, the second infrared ray projecting and receiving section includes an infrared ray projecting section provided at a first vehicle accessory and an infrared ray projecting and receiving section provided at a second vehicle accessory, the operating device includes a first driving device for driving on the basis of information received from the infrared ray projecting section in the first vehicle accessory, and a second driving device for driving on the basis of information received from the infrared ray projecting and receiving section in the second vehicle accessory.

BRIEF DESCRIPTION OF THE DRAWINGS

FIG. 1 is an overall structural view illustrating a communication system and operation system for a vehicle relating to a first embodiment of the present invention.

FIG. 2 is an overall structural view illustrating a communication system and operation system for a vehicle relating to a second embodiment of the present invention.

FIG. 3 is an overall structural view illustrating a communication system and operation system for a vehicle relating to a third embodiment of the present invention.

FIG. 4 is an overall structural view illustrating a communication system and operation system for a vehicle relating to a fourth embodiment of the present invention.

FIG. 5 is an overall structural view illustrating a communication system and operation system for a vehicle relating to a fifth embodiment of the present invention.

DESCRIPTION OF THE PREFERRED EMBODIMENTS (First Embodiment)

A description will be given below of a communication system for a vehicle and a vehicle accessory operation system that utilizes the communication system for a vehicle relating to a first embodiment of the present invention, with reference to FIG. 1.

As illustrated in FIG. 1, a communication system for a vehicle (a vehicle accessory operation system that utilizes the communication system for a vehicle) 10 is structured by three portions, namely, an inner view mirror (a rear view mirror) 12, a center console 14 and a remote controller 16.

An infrared ray projecting and receiving section 18 is provided at a lower edge side of the inner view mirror 12. The infrared ray projecting and receiving section 18 is provided with both an infrared ray projecting section and an infrared ray receiving section. Also, a car stereo device 22 is provided at the center console 14, which is disposed at a position adjacent to a steering wheel 20. A radio broadcast receiver, a compact disc player CD, a mini disc player MD, a cassette tape player and the like can be mounted to the car stereo device 22. Also, an infrared ray receiving section 24 is provided at the center console 14. The car stereo device 22 is electrically connected to the infrared ray receiving section 24 via an operation device (not shown in the drawing). An operation section (control section) 26 is provided at the remote controller 16. Further, an infrared ray projecting section 28 is provided at the remote controller 16.

In the structure described above, the center console 14 and the remote controller 16 correspond to an at least one "vehicle accessory" of the aspects of the present invention, the infrared ray projecting and receiving section 18 corresponds to a "first infrared ray projecting and receiving section" of the aspects of the present invention, and the infrared ray receiving section 24 and the infrared ray projecting section 28 correspond to a "second infrared ray projecting and receiving section" of the aspects of the present invention.

Next, a description will be given of the operation and effects of the present embodiment.

When a vehicle driver (occupant) operates the operation section 26 of the remote controller 16 while the infrared ray projecting section 28 of the remote controller 16 is directed toward the inner view mirror 12, an infrared ray 30 is projected from the infrared ray projecting section 28 toward the inner view mirror 12. Operation content (communicative content) operated (controlled) by the vehicle driver is included in the infrared ray 30 as a light signal.

At the inner view mirror 12, the above mentioned infrared ray 30 is received at the infrared ray receiving section of the infrared ray projecting and receiving section 18. The light signal of the infrared ray 30 is converted to an electric signal, and then the converted electric signal is converted back to a light signal. Next, an infrared ray 32 is projected from the infrared ray projecting section of the infrared ray projecting and receiving section 18 toward the center console 14.

At the center console 14, the infrared ray 32 is received at the infrared ray receiving section 24. The light signal of the infrared ray 32 is converted to an electric signal. Then, the car stereo device 22 is automatically operated on the basis of the operation content (communicative content) included in and carried by the infrared ray 32.

As mentioned above, in the present embodiment, bearing in mind advantages of the inner view mirror 12 (namely, the inner view mirror 12 is characterized by being located in a position such that the infrared rays, which are projected therefrom and are received thereat, are unlikely to be blocked, and in a position which is relatively close to the positions of the various vehicle accessories), the present embodiment achieves the communication system for a vehicle (the vehicle accessory operation system that utilizes the communication system for a vehicle) 10 among the three portions, namely, the inner view mirror 12, the center console 14 and the remote controller 16, as described above. Accordingly, it is possible to eliminate the wire harnesses, which are needed in the conventional communication system for a vehicle, are not required. As a result, in accordance with the present embodiment, a cost reduction, due to a decrease in the number of parts and a decrease in the number of assembly processes, can be achieved. Also, a reduction in weight of the vehicle, an increase in space in the vehicle, and an increase in design flexibility can be achieved.

Also, in the present embodiment, because the communication system for a vehicle (the vehicle accessory operation system that utilizes the communication system for a vehicle) 10 is achieved by use of the infrared rays 30 and 32, the cost can be kept lower than with a similar communication system for a vehicle (vehicle accessory operation system that utilizes the communication system for a vehicle) in which electric waves are used. Accordingly, in view thereof, a cost reduction effect can be expected.

In the communication system for a vehicle (the vehicle accessory operation system that utilizes the communication system for a vehicle) 10 relating to the present embodiment, the communication and operation system is achieved by the three portions, namely, the inner view mirror 12, the center console 14 (the car stereo device 22) and the remote controller 16, by use of infrared rays. This communication and operation system is used for operation (control) of the car stereo device 22. However, this communication and operation system is not limited to the same. Other functions may be added to the system, and functions in the communication and operation system may be replaced by other functions. For example, operation content (control detail) of the remote controller 16 may be displayed at the inner view mirror 12.

(Second Embodiment)

A description will be given below of a communication system for a vehicle and a vehicle accessory operation system that utilizes the communication system for a vehicle relating to a second embodiment of the present invention. In this case, the same reference numerals are attached to the same elements as those of the first embodiment mentioned above and a description thereof will be omitted.

As illustrated in FIG. 2, a communication system for a vehicle (a vehicle accessory operation system that utilizes the communication system for a vehicle) 40 is structured by three portions, namely, an inner view mirror 12, and a pair of outer view mirrors (side mirrors) (a right outer view mirror 42 and a left outer view mirror 44).

An infrared ray receiving and displaying section (combined display section and infrared ray receiving section) 46 is provided at a lower edge side of the inner view mirror 12. The infrared ray receiving and displaying section 46 is provided integrally with both an infrared ray receiving section and a displaying section. A displaying device (not shown in the drawing), which serves as an "operation device", for displaying predetermined messages at the infrared ray receiving and displaying section 46, is provided in the inner view mirror 12. Also, measurement distance sensors 48 and 50, for measuring distance from a following vehicle (a distance between the vehicle in which the system 40 is provided and a vehicle following the vehicle in which the system 40 is provided), are provided at the right outer view mirror 42 and left outer view mirror 44, respectively. Further, an infrared ray projecting section 52 is provided at the right outer view mirror 42 and an infrared ray projecting section 54 is provided at the left outer view mirror 44.

In the structure described above, the right outer view mirror 42 and left outer view mirror 44 correspond to the "vehicle accessories" of the aspects of the present invention, the infrared ray receiving and displaying section 46 corresponds to the "first infrared ray projecting and receiving section" of the aspects of the present invention, and the infrared ray projecting section 52 and the infrared ray projecting section 54 correspond to the "second infrared ray projecting and receiving section" of the aspects of the present invention.

Next, a description will be given of the operation and effects of the present embodiment.

The distance of a following vehicle is measured by the measurement sensor 48 of the right outer view mirror 42 and the measurement sensor 50 of the left outer view mirror 44 during vehicle movement. When the distance is measured, an infrared ray 56 is projected from the infrared ray projecting section 52 provided at the right outer view mirror 42 toward the inner view mirror 12, and an infrared ray 58 is projected from the infrared ray projecting section 54 provided at the left outer view mirror 44 toward the inner view mirror 12. The distance measured by the measurement distance sensors 48 and 50 (communicative content) are included in and carried by the infrared rays 56 and 58 as light signals.

At the inner view mirror 12, the above mentioned infrared rays 56 and 58 are received at the receiving section of the infrared ray receiving and displaying section 46. Then, the light signals of the infrared rays 56 and 58 are converted to electric signals, and the converted electric signals are processed by calculation. When calculation processing is completed, the displaying device (not shown in the drawing) is operated, and the distance is displayed on the displaying section of the infrared ray receiving and displaying section 46 of the inner view mirror 12. Accordingly, the vehicle driver can ascertain the distance of the following vehicle precisely, and safety can be improved.

As mentioned above, in the present embodiment, bearing in mind advantages of the inner view mirror 12, the present embodiment achieves the communication system for a vehicle (the vehicle accessory operation system that utilizes the communication system for a vehicle) 40 among the three portions, namely, the inner view mirror 12, the right outer view mirror 42 and the left outer view mirror 44, as described above. Accordingly, it is possible to eliminate the wire harnesses, which are needed in the conventional communication system for a vehicle, are not required. Also, in the present embodiment, the same as in the first embodiment, the communication system for a vehicle (the vehicle accessory operation system that utilizes the communication system for a vehicle) 40 is a system in which infrared rays are used, and the cost can be kept lower than with a similar communication system for a vehicle (a vehicle accessory operation system that utilizes the communication system for a vehicle) in which electric waves are used.

In the communication system for a vehicle (the vehicle accessory operation system that utilizes the communication system for a vehicle) 40 relating to the present embodiment, a communication and operation system for a vehicle is achieved by the three portions, namely, the inner view mirror 12, the right outer view mirror 42 and the left outer view mirror 44 by use of infrared rays, and the distance from the following vehicle is displayed. However, the communication and operation system of present embodiment is not limited to the same. Other functions may be added to the communication and operation system, and functions in the communication and operation system may be replaced by other functions. For example, a temperature sensor may be attached instead of the measurement distance sensor 48, the temperature outside the vehicle displayed on the inner view mirror 12, and a car air conditioner at the center console mentioned in the first embodiment operated automatically on the basis of the detected temperature outside the vehicle. Further, the inner view mirror 12 may be an electronic glare-shield mirror, and electronic color operation of the electronic glare-shield mirror may be automatically performed.

(Third Embodiment)

A description will be given below of a communication system for a vehicle and a vehicle accessory operation system that utilizes the communication system for a vehicle relating to a third embodiment of the present invention. In this case, the same reference numerals are attached to the same elements as those of the embodiments mentioned above and a description thereof will be omitted.

As illustrated in FIG. 3, a communication system for a vehicle (a vehicle accessory operation system that utilizes the communication system for a vehicle) 60 comprises two portions, namely, an inner view mirror 12 and a steering wheel 61.

The infrared ray projecting and receiving section 46 is provided at the lower edge side of the inner view mirror 12. The infrared ray projecting and receiving section 46 is integrally provided with both a displaying section and an infrared ray receiving section. A displaying device (not shown in the drawing), which is an "operation device", for displaying predetermined messages at the infrared ray receiving and displaying section 46, is provided at the inner view mirror 12. A mirror angle adjustment device, which is also an "operation device", is provided at the inner view mirror 12. A steering switch (switches) 64 is disposed at a left side portion of a wheel pad 62 of the steering wheel 61. At the steering switch 64, an angle adjustment switch 64A for changing mirror angle, a display switch 64B for displaying time, running distance of the vehicle (distance traveled), fuel remaining, outside temperature, inside temperature, a character broadcast and the like, and a reset switch 64C are provided. Further, an under side of the steering switch 64, an infrared ray projecting section 66 is provided.

In the structure described above, the steering wheel 61 corresponds to the "vehicle accessory" of the aspects of the present invention, the infrared ray receiving and displaying section 46 corresponds to the "first infrared ray projecting and receiving section" of the aspects of the present invention, and the infrared ray projecting section 66 corresponds to the "second infrared ray projecting and receiving section" of the aspects of the present invention.

Next, a description will be given of the operation and effects of the present embodiment.

When the driver, who is seated on a seat of the vehicle, operates the angle adjustment switch 64A of the steering switch 64, an infrared ray 68 is projected from the infrared ray projecting section 66 toward the inner view mirror 12. Communicative content is included in and carried by the infrared ray 68. The projected infrared ray 68 is received at the infrared ray receiving and displaying section 46 provided at the inner view mirror 12. At the inner view mirror 12, on the basis of the communicative content included in and carried by the received infrared ray 68, the mirror angle adjustment device, which is provided at the inner view mirror 12, is operated. Thus, the angle of the mirror is adjusted such that the rear field of view becomes optimal for the driver.

If the driver pushes the display switch 64B of the steering switch 64 once, the infrared ray 68 which includes a command for displaying time is projected from the infrared ray projecting section 66 toward the inner view mirror 12. The projected infrared ray 68 is received at the infrared ray receiving and displaying section 46 provided at the inner view mirror 12. At the inner view mirror 12, on the basis of the communicative content (the command for displaying time) included in and carried by the received infrared ray 68, the displaying device (not shown in the drawing), which is provided at the inner view mirror 12, is operated. The time is displayed on the infrared ray receiving and displaying section 46. If the driver pushes the display switch 64B of the steering switch 64 twice, the running distance of the vehicle is displayed on the infrared ray receiving and displaying section 46. If the driver pushes the display switch 64B of the steering switch 64 third time, the fuel remaining of the vehicle is displayed on the infrared ray receiving and displaying section 46. Further, the outside temperature, the inside temperature, character broadcast or the like is displayed on the infrared ray receiving and displaying section 46 when the display switch is pushed a corresponding number of times. When the driver wishes to erase the display displayed on the infrared ray receiving and displaying section 46, the reset switch 64C of the steering switch 64 may be pushed.

As mentioned above, in the present embodiment, bearing in mind the advantages of the inner view mirror 12, the present embodiment achieves the communication system for a vehicle (the vehicle accessory operation system that utilizes the communication system for a vehicle) 60 among the two portions, namely, the inner view mirror 12 and the steering wheel 61, as described above. Accordingly, it is possible to eliminate the wire harnesses, which are needed in the conventional communication system for a vehicle, are not required. Also, in the present embodiment, the same as in the first and the second embodiments, the communication system for a vehicle (the vehicle accessory operation system that utilizes the communication system for a vehicle) 60 is a system in which infrared rays are used, and the cost can be kept lower than with a similar communication system for a vehicle (an vehicle accessory operation system that utilizes the communication system for a vehicle) in which electric waves are used.

(Fourth Embodiment)

A description will be given below of a communication system for a vehicle and a vehicle accessory operation system that utilizes the communication system for a vehicle relating to a fourth embodiment of the present invention. In this case, the same reference numerals are attached to the same elements as those of the embodiments mentioned above and a description thereof will be omitted.

As illustrated in FIG. 4, a communication system for a vehicle (an vehicle accessory operation system that utilizes the communication system for a vehicle) 70 comprises three portions, namely, an inner view mirror 12, an outer view mirror 42 and a speaker 72.

An infrared ray projecting and receiving section 74 is provided at the lower edge side of the inner view mirror 12. The infrared ray projecting and receiving section 74 is composed of an infrared ray receiving section 74A and an infrared ray projecting and receiving section 74B, which is integrally provided with an infrared ray projecting section and an infrared ray receiving section. A mirror angle adjustment device (not shown in the drawing) is provided at the inner view mirror 12. An entry detection sensor 76 (for detecting whether the driver rides the vehicle), which uses infrared ray, is provided at the outer view mirror 42. An infrared ray projecting section 78 is also provided in the outer view mirror 42. Further, the speaker 72 is provided at a top portion of an instrument panel 80. At a back side of the speaker 72, an infrared ray projecting section 84, an infrared ray receiving section 82 and a voice recognizing switch 86 are provided.

In the structure described above, the outer view mirror 42 and the speaker 72 correspond to the "vehicle accessory" of the aspects of the present invention, the infrared ray receiving and projecting section 74 corresponds to the "first infrared ray projecting and receiving section" of the aspects of the present invention, and the infrared ray projecting section 78, the infrared ray receiving section 82 and the infrared ray projecting section 84 correspond to the "second infrared ray projecting and receiving section" of the aspects of the present invention.

Next, a description will be given of the operation and effects of the present embodiment.

When the driver operates (touches) an outside handle of a side door (not shown in the drawing) of the vehicle, presence of the driver (i.e., the fact that somebody is trying to get into the driver's seat) is detected by the entry detection sensor 76 provided at the outer view mirror 42. When the presence of the driver is detected by the entry detection sensor 76, an infrared ray 88 is projected from the infrared ray projecting section 78, which is provided at an inner edge portion of the outer view mirror 42, toward the speaker 72 which is provided inside the vehicle. The projected infrared ray 88 is received at the infrared ray receiving section 82 provided at the back side portion of the speaker 72. A light signal in the infrared ray 88 received at the infrared ray receiving section 82 is converted to an electric signal and, the voice recognizing switch 86 is energized and enters an operation state (ON state).

In this state, when the driver sits on the seat of the vehicle, and produces words (a voice), the voice is sensed by the voice recognizing switch 86. An infrared ray 90 is projected from the infrared ray projecting section 84 toward the inner view mirror 12. This infrared ray 90 is received at the infrared ray receiving section 74A provided at the inner view mirror 12. At the inner view minor 12, on the basis of communicative content (the fact that the driver is sitting on the seat of the vehicle) included in and carried by the received infrared ray 90, the infrared ray projecting and receiving section 74B is operated. That is, an infrared ray 92 is projected from the projecting section of the infrared ray projecting and receiving section 74B toward the driver side. Then, a reflected infrared ray 94 is received at the receiving section of the infrared ray projecting and receiving section 74B. Note that in FIG. 4, because the infrared rays 92 and 94 are shown exaggeratedly, the infrared ray 94 is illustrated such that the same is not received at the infrared ray projecting and receiving section 74B. However, in actuality, the infrared ray 94 returns to the infrared ray projecting and receiving section 74B within a receivable range.

Consequently, position of the driver's head or the like is detected, and the mirror angle adjustment device (not shown at the drawing) provided in the inner view mirror 12 is operated. Thus, the angle of the mirror is adjusted such that the rear field of view becomes optimal for the driver.

As mentioned above, in the present embodiment, bearing in mind the advantages of the inner view mirror 12, the present embodiment achieves the communication system for a vehicle (the vehicle accessory operation system that utilizes the communication system for a vehicle) 70 among the three portions, namely, the inner view mirror 12, the outer view mirror 42, and the speaker 72, as described above. Accordingly, it is possible to eliminate the wire harnesses, which are needed in the conventional communication system for a vehicle, are not required. Also, in the present embodiment, the same as in the first, second and third embodiments, the communication system for a vehicle (the vehicle accessory operation system that utilizes the communication system for a vehicle) 70 is a system in which infrared rays are used, and the cost can be kept lower than with a similar communication system for a vehicle in which electric waves are used.

The communication system for a vehicle (the vehicle accessory operation system that utilizes the communication system for a vehicle) 70 relating to this embodiment can also be applied to a crime prevention system. That is, basically, the information of the position of the driver's head or the like which is detected by the infrared ray projecting and receiving section 74B at the inner view mirror 12 should be substantially the same whenever a particular person sits on the driver's seat. Accordingly, a system can be accomplished as follows: a value which relates to information of the position of the head of an owner driver in cases when the owner driver is sitting on the driver's seat, and in which a certain predetermined error tolerance is included, is pre-stored in a storing section of a controller 100; when a detected value is different from the above mentioned value (for example, when a person other than the owner driver sits on the driver's seat), a warning can be outputted from the speaker (for example, a message such as "please speak your personal identification number into the speaker" or the like); if a correct response to the warning (for example, a personal identification number such as "1 2 3 4" or the like) is performed within a predetermined time, it is judged that a person, who is authorized to ride in the vehicle (for example, a member of the owner driver's family); is in the vehicle; however, if the correct response is not performed or is not done within the predetermined time, it is judged that a person, who is not authorized to ride in the vehicle, is in the vehicle, and this judgment is communicated to the police, or a security company 110, or to a mobile phone 120 of the owner driver.

(Other Embodiments)

It is possible to construct a system other than the above mentioned the first, second, third and fourth embodiments by combination of various types.

For example, it is possible to construct a system in which the angle of the inner view mirror is automatically adjusted in advance before the driver gets into the vehicle, by an infrared ray which is projected from a smart key is received at the inner view mirror through a door window, releasing a door lock.

Also, for example, it is possible to construct a system in which the inner view mirror is directly attached to a wind shield glass, and a rain drop sensor is provided. When rain is detected by the rain drop sensor, an infrared ray is projected from the rain drop sensor toward the inner view mirror and an infrared ray is projected from the inner view mirror toward a steering switch (a wiper switch). Thus, a wiper device may be operated automatically.

Further, with the present invention, this system can be applied to either of a situation in which the inner view mirror is provided at a roof head lining (ceiling trim) and a situation in which the inner view mirror is provided at the wind shield glass directly. In particular, because it is difficult to provide wire harnesses in the case of the situation in which the inner view mirror is provided at the wind shield glass directly, the present invention has a great advantage.

As mentioned above, the first aspect of the present invention is a communication system for a vehicle comprising an inner view mirror in which a first infrared ray projecting and receiving section which can at least one of project and receive an infrared ray; and at least one vehicle accessory, in which a second infrared ray projecting and receiving section which can at least one of project and receive an infrared ray and which is to communicate with the inner view mirror, other than the inner view mirror, and the second aspect of the present invention is an vehicle accessory operation system that utilizes the communication system for a vehicle comprising: an inner view mirror in which a first infrared ray projecting and receiving section which can at least one of project and receive an infrared ray; and at least one vehicle accessory, in which a second infrared ray projecting and receiving section which can at least one of project and receive an infrared ray and which is to communicate with the inner view mirror, other than the inner view mirror, wherein an operation device is provided at least one of the inner view mirror and the vehicle accessory, and the operation device is operated by use of the communication system for a vehicle. Accordingly, a lower cost thereof and non-wire harnesses structure thereof as long as possible can be achieved.

What is claimed is:

1. A communication system for a vehicle, the communication system comprising:
   an inner view mirror provided with a first infrared ray projecting and receiving section that is capable of projecting and receiving an infrared ray; and
   at least one vehicle accessory other than the inner view mirror, which vehicle accessory is provided with a second infrared ray projecting and receiving section that is capable of at least one of projecting and receiving an infrared ray and that is disposed so as to communicate with the inner view mirror.

2. A vehicle accessory operating system of a vehicle, wherein
   the vehicle has a communication system which includes an inner view mirror provided with a first infrared ray projecting and receiving section that is capable of projecting and receiving an infrared ray, and which includes at least one vehicle accessory other than the inner view mirror, which vehicle accessory is provided with a second infrared ray projecting and receiving section that is capable of at least one of projecting and receiving an infrared ray and that is disposed so as to communicate with the inner view mirror,
   at least one of the inner view mirror and the vehicle accessory is provided with an operating device, and
   the operating device is operated by utilization of the communication system.

3. A communication system for a vehicle, the communication system comprising:
   an inner view mirror provided with a first infrared ray projecting and receiving section that is capable of at least one of projecting and receiving an infrared ray; and
   at least one vehicle accessory other than the inner view mirror, which vehicle accessory is provided with a second infrared ray projecting and receiving section that is capable of at least one of projecting and receiving an infrared ray and that is disposed so as to communicate with the inner view mirror,
   the first infrared ray projecting and receiving section being an infrared ray projecting and receiving section provided at the inner view mirror,
   the second infrared ray projecting and receiving section including an infrared ray receiving section provided at the vehicle accessory and an infrared ray projecting section provided at a device for operating the vehicle accessory.

4. A communication system for a vehicle according to claim 3, wherein
   the vehicle accessory is a car stereo device and the device for operating the vehicle accessory is a remote controller for the car stereo device.

5. A communication system for a vehicle according to claim 1, wherein
   the first infrared ray projecting and receiving section is an infrared ray receiving section provided at the inner view mirror,
   the second infrared ray projecting and receiving section is an infrared ray projecting section provided at the vehicle accessory.

6. A communication system for a vehicle according to claim 5, wherein the vehicle accessory is an outer view mirror.

7. A communication system for a vehicle according to claim 5, wherein the vehicle accessory is a steering wheel.

8. A communication system for a vehicle according to claim 1, wherein
   the first infrared ray projecting and receiving section includes an infrared ray receiving section and an infrared ray projecting and receiving section, which are provided at the inner view mirror,
   the second infrared ray projecting and receiving section includes an infrared ray projecting section provided at a first vehicle accessory and an infrared ray projecting and receiving section provided at second vehicle accessory.

9. A communication system for a vehicle according to claim 8, wherein the first vehicle accessory is an outer view mirror and the second vehicle accessory is a speaker system.

10. A vehicle accessory operating system for a vehicle according to claim 2, wherein
    the operating device is at least one of:
    a display device for displaying information on the basis of the information received from the second infrared ray projecting and receiving section; and
    a driving device for driving at least one of the inner view mirror and the vehicle accessory on the basis of the information received from the second infrared ray projecting and receiving section.

11. A vehicle accessory operating system of a vehicle according to claim 10, wherein
    the first infrared ray projecting and receiving section is an infrared ray receiving section provided at the inner view mirror, the second infrared ray projecting and receiving section is an infrared ray projecting section provided at the vehicle accessory, the operating device is the display device for displaying the information received from the second infrared ray projecting and receiving section.

12. A vehicle accessory operating system of a vehicle according to claim 11, wherein the vehicle accessory is an outer view mirror at which a device for measuring a distance from a following vehicle is provided, the display device for displaying the measured distance from the following vehicle, is provided at the inner view mirror.

13. A vehicle accessory operating system of a vehicle according to claim 10, wherein the first infrared ray projecting and receiving section is an infrared ray receiving section provided at the inner view mirror, the second infrared ray projecting and receiving section is an infrared ray projecting section provided at the vehicle accessory, the operating device includes the display device for displaying information received from the second infrared ray projecting and receiving section, and the driving device for driving the inner view mirror on the basis of the information received from the second infrared ray projecting and receiving section.

14. A vehicle accessory operating system of a vehicle according to claim 13, wherein the vehicle accessory is a steering wheel at which a steering switch, for operating the display device and the driving device, is provided, the display device for displaying information relating to the vehicle on the basis of an operation of the steering switch, is provided at the inner view mirror, the driving device for adjusting a position of the inner view mirror on the basis of an operation of the steering switch, is provided at the inner view mirror.

15. A vehicle accessory operating system of a vehicle according to claim 10, wherein the first infrared ray projecting and receiving section includes an infrared ray receiving section and an infrared ray projecting and receiving section, which are provided at the inner view mirror, the second infrared ray projecting and receiving section includes an infrared ray projecting section provided at a first vehicle accessory and an infrared ray projecting and receiving section provided at a second vehicle accessory, the operating device includes a first driving device for driving on the basis of information received from the infrared ray projecting section in the first vehicle accessory, and a second driving device for driving on the basis of information received from the infrared ray projecting and receiving section in the second vehicle accessory.

16. A vehicle accessory operating system of a vehicle according to claim 15, wherein the first vehicle accessory is an outer view mirror at which a sensor for sensing a person, is provided, the second vehicle accessory is a speaker system at which a voice recognition device is provided.

* * * * *